United States Patent
Kamino et al.

(10) Patent No.: US 9,186,555 B2
(45) Date of Patent: *Nov. 17, 2015

(54) GOLF BALL

(75) Inventors: Kazuya Kamino, Kobe (JP); Keiji Ohama, Kobe (JP); Hirotaka Nakamura, Kobe (JP)

(73) Assignee: Dunlop Sports Co. Ltd., Kobe-shi (JP)

( * ) Notice: Subject to any disclaimer, the term of this patent is extended or adjusted under 35 U.S.C. 154(b) by 673 days.

This patent is subject to a terminal disclaimer.

(21) Appl. No.: 13/454,486

(22) Filed: Apr. 24, 2012

(65) Prior Publication Data

US 2012/0208654 A1   Aug. 16, 2012

Related U.S. Application Data

(63) Continuation of application No. 12/545,230, filed on Aug. 21, 2009, now Pat. No. 8,182,368.

(30) Foreign Application Priority Data

Sep. 24, 2008   (JP) .................................. 2008-243519
Nov. 21, 2008   (JP) .................................. 2008-297506

(51) Int. Cl.
*A63B 37/06*   (2006.01)
*A63B 37/00*   (2006.01)
*A63B 37/02*   (2006.01)

(52) U.S. Cl.
CPC ......... *A63B 37/0031* (2013.01); *A63B 37/0003* (2013.01); *A63B 37/006* (2013.01); *A63B 37/0033* (2013.01); *A63B 37/0043* (2013.01); *A63B 37/0045* (2013.01);

(Continued)

(58) Field of Classification Search
CPC .................. A63B 37/0044; A63B 37/0076
USPC ........................................... 473/376
See application file for complete search history.

(56) References Cited

U.S. PATENT DOCUMENTS

| | | |
|---|---|---|
| 6,271,296 B1 | 8/2001 | Nakamura et al. |
| 6,468,169 B1 | 10/2002 | Hayashi et al. |
| 6,478,696 B1 | 11/2002 | Yamagishi et al. |

(Continued)

FOREIGN PATENT DOCUMENTS

| | | |
|---|---|---|
| JP | 2000-350795 A | 12/2000 |
| JP | 2001-17571 A | 1/2001 |

(Continued)

OTHER PUBLICATIONS

Japanese Office Action dated Jul. 10, 2012 for Application No. 2008-297506.

*Primary Examiner* — Raeann Gorden
(74) *Attorney, Agent, or Firm* — Birch, Stewart, Kolasch & Birch, LLP

(57) ABSTRACT

A golf ball 2 includes a core 4, an envelope layer 6 positioned outside the core 4, a mid layer 8 positioned outside the envelope layer 6, and a cover 10 positioned outside the mid layer 8. The core 4 includes a spherical center 12 and a core outer layer 14 positioned outside the center 12. The center 12 has a diameter of 1 mm or greater and 15 mm or less. The difference (H4–H3) between the JIS-C hardness H4 of the core 4 at its surface and the JIS-C hardness H3 of the core outer layer 14 at its innermost portion is equal to or greater than 10. The cover 10 has a Shore D hardness H7 less than 40. The Shore D hardnesses H5, H6 and H7 of the envelope layer 6, the mid layer 8, and the cover 10 satisfy that H5>H6≥H7.

11 Claims, 1 Drawing Sheet

(52) U.S. Cl.
CPC ............ *A63B 37/0064* (2013.01); *A63B 37/02* (2013.01); *A63B 37/0062* (2013.01); *A63B 37/0076* (2013.01)

(56) References Cited

U.S. PATENT DOCUMENTS

| | | | |
|---|---|---|---|
| 7,153,224 B2 * | 12/2006 | Higuchi et al. | 473/376 |
| 8,182,368 B2 * | 5/2012 | Kamino et al. | 473/376 |
| 2002/0037778 A1 | 3/2002 | Nakamura et al. | |
| 2003/0064828 A1 | 4/2003 | Kato | |
| 2003/0166422 A1 | 9/2003 | Kato | |
| 2004/0029648 A1 | 2/2004 | Kato | |
| 2004/0033847 A1 | 2/2004 | Higuchi et al. | |
| 2004/0235587 A1 | 11/2004 | Sullivan et al. | |
| 2008/0146377 A1 | 6/2008 | Watanabe | |

FOREIGN PATENT DOCUMENTS

| | | |
|---|---|---|
| JP | 2001-17573 A | 1/2001 |
| JP | 2001-314530 A | 11/2001 |
| JP | 2002-272880 A | 9/2002 |
| JP | 2008-149130 A | 7/2008 |

* cited by examiner

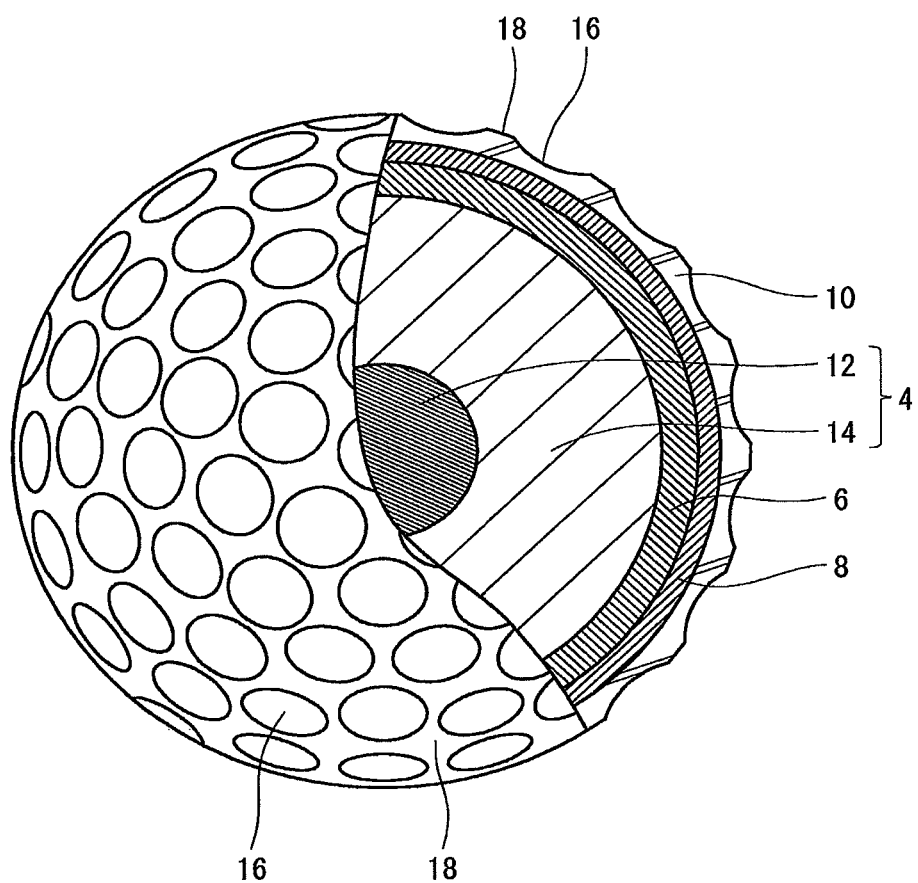

GOLF BALL

This application is a Continuation of co-pending application Ser. No. 12/545,230, filed on Aug. 21, 2009 now U.S. Pat. No. 8,182,368. Priority is claimed to Japanese Patent Application No. 2008-243519 filed on Sep. 24, 2008 and Japanese Patent Application No. 2008-297506 filed on Nov. 21, 2008. The entire contents of these Japanese Patent Applications are hereby incorporated by reference.

BACKGROUND OF THE INVENTION

1. Field of the Invention

The present invention relates to golf balls. Specifically, the present invention relates to multi-piece golf balls including a center, a core outer layer, an envelope layer, a mid layer and cover.

2. Description of the Related Art

The greatest interest to golf players concerning golf balls is flight performance. In particular, golf players place importance on a flight distance upon a shot with a driver. By using a golf ball that has a long flight distance upon a shot with a driver, golf players can hit a second shot at a point close to the green. A flight distance upon a shot with a driver correlates with a spin rate. A golf ball with a low spin rate has excellent flight performance. In addition, flight performance correlates with the resilience performance of a golf ball.

Golf players also place importance on spin performance of golf balls. If a backspin rate is high, the run is short. By using a golf ball that has a high backspin rate, golf players can cause the golf ball to stop at a target point. If a sidespin rate is high, the golf ball tends to curve. By using a golf ball that has a high sidespin rate, golf players can intentionally cause the golf ball to curve. A golf ball with excellent spin performance has excellent controllability. In particular, advanced golf players place importance on controllability upon a shot with a short iron.

Golf players also place importance on feel at impact of golf balls. In general, golf players prefer soft feel at impact.

Golf balls with a cover including a polyurethane are commercially available. In general, polyurethanes are flexible. Spin is easily given to this golf ball. This cover contributes to the controllability. On the other hand, if this golf ball is hit with a driver, this cover causes excessive spin. This cover impairs the flight performance.

Golf balls with a core and a thin cover formed from a polyurethane are commercially available. This core includes a center and a mid layer. The mid layer is formed from a hard synthetic resin. This mid layer achieves an outer-hard/inner-soft structure of the core. When this golf ball is hit with a driver, the core deforms significantly because the cover is thin. The outer-hard/inner-soft structure of the core suppresses spin. This core achieves a long flight distance upon a shot with a driver. When this golf ball is hit with a short iron, a high spin rate is achieved by the flexible cover. This cover contributes to the controllability upon a shot with a short iron. This golf ball has hard feel at impact because the cover is thin and the mid layer is hard.

Various golf balls with a multilayer structure have been proposed. U.S. Pat. No. 6,468,169 (JP-HEI10-328326A) discloses a golf ball including a core, an envelope layer, an inner cover and an outer cover. U.S. Pat. No. 6,271,296 (JP2001-17575A) discloses a golf ball including a core, an envelope layer, a core outer layer and a cover. JP2002-272880A discloses a golf ball including a core and a cover. The core consists of a center and an outer core layer. The cover consists of an inner cover layer and an outer cover layer. US2003/64828 (JP2003-10359A) discloses a golf ball including a core and a cover. The core consists of a center and a mid layer. US2003/166422 (JP2003-205052A) discloses a golf ball including a core and a cover. The core consists of a center and a mid layer. US2004/29648 (JP2004-130072A) discloses a golf ball including a core and a cover. The core consists of a center, a mid layer and an outer layer.

In the golf ball disclosed in U.S. Pat. No. 6,468,169, the cover is hard. The golf ball has inferior controllability. In the golf ball disclosed in U.S. Pat. No. 6,271,296, the envelope layer is hard. The golf ball has inferior flight performance upon a shot with a driver. In the golf ball disclosed in JP2002-272880A, the cover is hard. The golf ball has inferior controllability. In the golf ball disclosed in US2003/64828, the cover is hard. The golf ball has inferior controllability. In the golf ball disclosed in US2003/166422, the cover is hard. The golf ball has inferior controllability. In the golf ball disclosed in US2004/29648, the cover is hard. The golf ball has inferior controllability.

Golf players' requirements for golf balls have been escalated more than ever. An objective of the present invention is to provide a golf ball that is excellent in various performance characteristics.

SUMMARY OF THE INVENTION

A golf ball according to the present invention comprises a core, an envelope layer positioned outside the core, a mid layer positioned outside the envelope layer, and a cover positioned outside the mid layer. The core includes a center and a core outer layer positioned outside the center. The center has a diameter of 1 mm or greater and 15 mm or less. A difference (H4−H3) between a JIS-C hardness H4 of the core at its surface and a JIS-C hardness H3 of the core outer layer at its innermost portion is equal to or greater than 10. The cover has a Shore D hardness H7 less than 40. A Shore D hardness H5 of the envelope layer, a Shore D hardness H6 of the mid layer, and a Shore D hardness H7 of the cover satisfy the following mathematical formula (I).

$$H5 > H6 \geq H7 \tag{I}$$

In the golf ball according to the present invention, the center, the core outer layer and the envelope layer achieve an outer-hard/inner-soft structure. In the golf ball, a diameter of the center is small and the hardness difference (H4−H3) of the core outer layer is great. Thus, the step of hardness at the boundary between the center and the core outer layer is small. While a conventional golf ball has an outer-hard/inner-soft structure with a hardness distribution having inferior continuity, the golf ball according to the present invention has an outer-hard/inner-soft structure with a hardness distribution having excellent continuity. In the golf ball, the spin upon a shot with a driver is suppressed sufficiently. Because the diameter of the center is small, the center does not impair the resilience performance of the golf ball. Because the hardness of the cover is low, the cover contributes to the controllability upon a shot with a short iron. The golf ball has excellent flight performance and excellent controllability.

Preferably, a difference (H4−H1) between the hardness H4 and a JIS-C hardness H1 of the center at its central point is equal to or greater than 30. Preferably, a difference (H3−H2) between the hardness H3 and a JIS-C hardness H2 of the center at its surface is equal to or less than 35. Preferably, a hardness of the envelope layer is greater than a surface hardness of the core. Preferably, the hardness H6 is greater than the hardness H7. Preferably, a difference (H5−H6) between the hardness H5 and the hardness H6 is equal to or greater than 5 and equal to or less than 40. Preferably, a difference (H6−H7) between the hardness H6 and the hardness H7 is equal to or greater than 3 and equal to or less than 28.

Preferably, a JIS-C hardness H1 of the center at its central point is equal to or greater than 20 and equal to or less than 50. Preferably, the hardness H3 is equal to or greater than 45 and equal to or less than 75, and the hardness H4 is equal to or greater than 65 and equal to or less than 95. Preferably, the hardness H5 is equal to or greater than 50. Preferably, the hardness H5 is equal to or greater than 50 and equal to or less than 80. Preferably, the hardness H6 is equal to or greater than 30 and equal to or less than 60. Preferably, the hardness H7 is equal to or greater than 10 and less than 40.

The center can be formed by crosslinking a rubber composition. Preferably, a principal component of a base material of the rubber composition is a polybutadiene. The rubber composition includes sulfur as a crosslinking agent.

Preferably, a principal component of a base material of the envelope layer is an ionomer resin. Preferably, a principal component of a base material of the mid layer is one or more selected from the group consisting of polyurethanes, polyesters, polyamides, polyolefins, polystyrenes and ionomer resins. Preferably, a principal component of a base material of the cover is a thermoplastic polyurethane elastomer.

Preferably, the mid layer has a thickness Tm less than 1.2 mm. Preferably, the cover has a thickness Tc of 0.6 mm or less.

Preferably, a sphere consisting of the core and the envelope layer has an amount of compressive deformation of 2.0 mm or greater and 3.6 mm or less. Preferably, a sphere consisting of the core, the envelope layer and the mid layer has an amount of compressive deformation of 2.3 mm or greater and 4.0 mm or less.

BRIEF DESCRIPTION OF THE DRAWINGS

FIG. 1 is a schematic cross-sectional view of a golf ball according to an embodiment of the present invention.

DESCRIPTION OF THE PREFERRED EMBODIMENTS

The following will describe in detail the present invention based on preferred embodiments with reference to the accompanying drawing.

Golf ball 2 shown in FIG. 1 includes a core 4, an envelope layer 6 positioned outside the core 4, a mid layer 8 positioned outside the envelope layer 6, and a cover 10 positioned outside the mid layer 8. The core 4 includes a spherical center 12 and a core outer layer 14 positioned outside the center 12. On the surface of the cover 10, a large number of dimples 16 are formed. Of the surface of the golf ball 2, a part other than the dimples 16 is a land 18. The golf ball 2 includes a paint layer and a mark layer on the external side of the cover 10 although these layers are not shown in the drawing.

The golf ball 2 has a diameter of 40 mm or greater and 45 mm or less. From the standpoint of conformity to the rules established by the United States Golf Association (USGA), the diameter is preferably equal to or greater than 42.67 mm. In light of suppression of air resistance, the diameter is preferably equal to or less than 44 mm and more preferably equal to or less than 42.80 mm. The golf ball 2 has a weight of 40 g or greater and 50 g or less. In light of attainment of great inertia, the weight is preferably equal to or greater than 44 g and more preferably equal to or greater than 45.00 g. From the standpoint of conformity to the rules established by the USGA, the weight is preferably equal to or less than 45.93 g.

The center 12 is obtained by crosslinking a rubber composition. Examples of preferable base rubbers for use in the rubber composition include polybutadienes, polyisoprenes, styrene-butadiene copolymers, ethylene-propylene-diene copolymers and natural rubbers. In light of resilience performance, polybutadienes are preferred. When another rubber is used in combination with a polybutadiene, it is preferred if the polybutadiene is included as a principal component. Specifically, the proportion of the polybutadiene to the entire base rubber is preferably equal to or greater than 50% by weight and more preferably equal to or greater than 80% by weight. The proportion of cis-1,4 bonds in the polybutadiene is preferably equal to or greater than 40 mol % and more preferably equal to or greater than 80 mol %.

The rubber composition of the center 12 includes sulfur. The sulfur serves to crosslink the rubber molecules. The center 12 obtained by sulfur crosslinking is flexible. The center 12 achieves an outer-hard/inner-soft structure of the core 4. The core 4 suppresses spin upon a shot with a driver. The core 4 also contributes to the feel at impact.

In light of resilience performance of the golf ball 2, the amount of the sulfur is preferably equal to or greater than 2.0 parts by weight and particularly preferably equal to or greater than 3.0 parts by weight, per 100 parts by weight of the base rubber. In light of flexibility of the center 12, the amount of the sulfur is preferably equal to or less than 10.0 parts by weight and particularly preferably equal to or less than 6.5 parts by weight, per 100 parts by weight of the base rubber.

Preferably, the rubber composition of the center 12 includes a vulcanization accelerator. The vulcanization accelerator achieves a short time period for crosslinking the center 12. Guanidine type vulcanization accelerators, thiazole type vulcanization accelerators, sulfenamide type vulcanization accelerators, aldehyde-ammonia type vulcanization accelerators, thiourea type vulcanization accelerators, thiuram type vulcanization accelerators, dithiocarbamate type vulcanization accelerators, xanthate type vulcanization accelerators and the like can be used. Guanidine type vulcanization accelerators, thiazole type vulcanization accelerators and sulfenamide type vulcanization accelerators are preferred. Two or more types of vulcanization accelerators may be used in combination.

Examples of guanidine type vulcanization accelerators include 1,3-diphenylguanidine, 1,3-di-o-tolylguanidine, 1-o-tolylbiguanide and the di-o-tolylguanidine salt of dicatechol borate. Specific examples of 1,3-diphenylguanidine include trade names "Nocceler D" and "Nocceler D-P" available from Ouchi Shinko Chemical Industrial Co., Ltd., and trade names "Soxinol D", "Soxinol DG", and "Soxinol DO", available from Sumitomo Chemical Co., Ltd. Specific examples of 1,3-di-o-tolylguanidine include trade name "Nocceler DT" available from Ouchi Shinko Chemical Industrial Co., Ltd., and trade names "Soxinol DT" and "Soxinol DT-O" available from Sumitomo Chemical Co., Ltd. One specific example of 1-o-tolylbiguanide is trade name "Nocceler BG" available from Ouchi Shinko Chemical Industrial Co., Ltd. One specific example of the di-o-tolylguanidine salt of dicatechol borate is trade name "Nocceler PR" available from Ouchi Shinko Chemical Industrial Co., Ltd.

Examples of thiazole type vulcanization accelerators include 2-mercaptobenzothiazole, di-2-benzothiazolyl disulfide, 2-mercaptobenzothiazole zinc salt, 2-mercaptobenzothiazole cyclohexylamine salt, 2-(N,N-diethylthiocarbamoylthio)benzothiazole and 2-(4'-morpholinodithio) benzothiazole. Specific examples of 2-mercaptobenzothiazole include trade names "Nocceler M" and "Nocceler M-P" available from Ouchi Shinko Chemical Industrial Co., Ltd. Specific examples of di-2-benzothiazolyl disulfide include trade names "Nocceler DM" and "Nocceler DM-P" available from Ouchi Shinko Chemical Industrial Co., Ltd. One specific example of 2-mercaptobenzothiazol zinc salt is trade name "Nocceler MZ" available from Ouchi Shinko Chemical Industrial Co., Ltd. One specific example of 2-mercaptobenzothiazole cyclohexylamine salt is trade name "Nocceler M-60-OT" available from Ouchi Shinko Chemical Industrial Co., Ltd. One specific example of 2-(N,N-diethylthiocarbamoylthio)benzothiazole is trade name "Nocceler 64" available from Ouchi Shinko Chemical Industrial Co., Ltd. Specific examples of 2-(4'-morpholinodithio)benzothiazole include trade names "Nocceler MDB" and "Nocceler MDB-P" available from Ouchi Shinko Chemical Industrial Co., Ltd.

Examples of sulfenamide type vulcanization accelerators include N-cyclohexyl-2-benzothiazolyl sulfenamide, N-tert-butyl-2-benzothiazolyl sulfenamide, N-oxydiethylene-2-benzothiazolyl sulfenamide and N,N'-dicyclohexyl-2-benzothiazolyl sulfenamide. Specific examples of N-cyclohexyl-2-benzothiazolyl sulfenamide include trade names "Nocceler CZ" and "Nocceler CZ-G" available from Ouchi Shinko Chemical Industrial Co., Ltd. Specific examples of N-tert-butyl-2-benzothiazolyl sulfenamide include trade names "Nocceler NS" and "Nocceler NS-P" available from Ouchi Shinko Chemical Industrial Co., Ltd. One specific example of N-oxydiethylene-2-benzothiazolyl sulfenamide is trade name "Nocceler MSA-G" available from Ouchi Shinko Chemical Industrial Co., Ltd. Specific examples of N,N'-dicyclohexyl-2-benzothiazolyl sulfenamide include trade names "Nocceler DZ" and "Nocceler DZ-G" available from Ouchi Shinko Chemical Industrial Co., Ltd.

The amount of the vulcanization accelerator is preferably equal to or greater than 0.5 part by weight and particularly preferably equal to or greater than 2.0 parts by weight, per 100 parts by weight of the base rubber. The amount of the vulcanization accelerator is preferably equal to or less than 7.0 parts by weight and particularly preferably equal to or less than 5.0 parts by weight, per 100 parts by weight of the base rubber.

In a general golf ball, the rubber composition of the center includes an organic peroxide. The organic peroxide contributes to the resilience performance of the golf ball. On the other hand, the organic peroxide increases the hardness of the center. The center 12 of the golf ball 2 shown in FIG. 1 does not include any organic peroxide. Because of the rubber composition, a flexible center 12 is obtained. The rubber composition may include an organic peroxide in a small amount.

Preferably, the center 12 includes a reinforcing material. A preferable reinforcing material is silica (white carbon). Silica can achieve appropriate rigidity of the center 12. Dry-process silica and wet-process silica can be used. In light of rigidity of the center 12, the amount of the silica is preferably equal to or greater than 5 parts by weight and particularly preferably equal to or greater than 10 parts by weight, per 100 parts by weight of the base rubber. In light of flexibility of the center 12, the amount of the silica is preferably equal to or less than 40 parts by weight and particularly preferably equal to or less than 30 parts by weight, per 100 parts by weight of the base rubber. A silane coupling agent may be included together with silica.

For the purpose of adjusting specific gravity and the like, a filler may be included in the center 12. Examples of suitable fillers include zinc oxide, barium sulfate, calcium carbonate and magnesium carbonate. Powder of a metal with a high specific gravity may be included as a filler. Specific examples of metals with a high specific gravity include tungsten and molybdenum. The amount of the filler is determined as appropriate so that the intended specific gravity of the center 12 is accomplished. A particularly preferable filler is zinc oxide. Zinc oxide serves not only as a specific gravity adjuster but also as a crosslinking activator.

According to need, various additives such as an anti-aging agent, a coloring agent, a plasticizer, a dispersant, a co-crosslinking agent, an organic sulfur compound and the like are included in the center 12 in an adequate amount. Crosslinked rubber powder or synthetic resin powder may be also included in the center 12.

In light of durability, the center 12 has at its central point a hardness $H1$ of preferably 20 or greater, more preferably 25 or greater, and particularly preferably or greater. In light of suppression of spin, the hardness $H1$ is preferably equal to or less than 50, more preferably equal to or less than 45, and particularly preferably equal to or less than 40. The hardness $H1$ is measured by pressing a JIS-C type hardness scale against the central point of a cut plane of the center 12 that has been cut into two halves. For the measurement, an automated rubber hardness measurement machine (trade name "P1", available from Kobunshi Keiki Co., Ltd.), to which this hardness scale is mounted, is used.

The hardness of the center 12 gradually increases from its central point toward its surface. The center 12 has a surface hardness $H2$ greater than the central hardness $H1$. The great surface hardness $H2$ can achieve continuity of hardness between the center 12 and the core outer layer 14. In this respect, the surface hardness $H2$ of the center is preferably equal to or greater than 25, more preferably equal to or greater than 30, and particularly preferably equal to or greater than 35. In light of feel at impact, the surface hardness $H2$ is preferably equal to or less than 70, more preferably equal to or less than 60, and particularly preferably equal to or less than 50. The surface hardness $H2$ is measured by pressing a JIS-C type hardness scale against the surface of the center 12. For the measurement, an automated rubber hardness measurement machine (trade name "P1", available from Kobunshi Keiki Co., Ltd.), to which this hardness scale is mounted, is used.

In light of feel at impact, the difference ($H2-H1$) between the hardness $H2$ and the hardness $H1$ is preferably equal to or greater than 1, more preferably equal to or greater than 3, and particularly preferably equal to or greater than 5. In light of resilience performance, the difference ($H2-H1$) is preferably equal to or less than 15, more preferably equal to or less than 10, and particularly preferably equal to or less than 7.

In light of feel at impact, the center 12 has an amount of compressive deformation $D1$ of preferably 0.5 mm or greater, more preferably 1.0 mm or greater, and particularly preferably 1.1 mm or greater. In light of resilience performance, the amount of compressive deformation $D1$ is preferably equal to or less than 2.5 mm, more preferably equal to or less than 2.3 mm, and particularly preferably equal to or less than 2.0 mm.

Upon measurement of the amount of compressive deformation, first, a sphere is placed on a hard plate made of metal. Next, a cylinder made of metal gradually descends toward the sphere. The sphere, squeezed between the bottom face of the cylinder and the hard plate, becomes deformed. A migration distance of the cylinder, starting from the state in which an initial load is applied to the sphere up to the state in which a final load is applied thereto, is the amount of compressive deformation. In measuring the amount of compressive deformation $D1$ of the center 12, the initial load is 0.3 N and the final load is 29.4 N. In measuring: the amount of compressive deformation $D2$ of the core 4; the amount of compressive deformation $D3$ of a sphere consisting of the core 4 and the envelope layer 6; the amount of compressive deformation D4 of a sphere consisting of the core 4, the envelope layer 6 and the mid layer 8; and the amount of compressive deformation D5 of the golf ball 2, the initial load is 98 N and the final load is 1274 N.

The center 12 has a diameter less than that of the center of a general golf ball. Because of the small center 12, the core outer layer 14 can be formed with a sufficient thickness. The core outer layer 14 can achieve an outer-hard/inner-soft structure with a hardness distribution having excellent continuity. The small center 12 suppresses spin. Even if being flexible, the small center 12 does not impair the resilience performance of the golf ball 2. In light of continuity of the hardness distribution and resilience performance, the diameter of the center 12 is preferably equal to or less than 15 mm, more preferably equal to or less than 12 mm, and particularly preferably equal to or less than 10 mm. From the standpoint that the center 12 can contribute to suppression of spin, the diameter is preferably equal to or greater than 2 mm, more preferably equal to or greater than 4 mm, and particularly preferably equal to or greater than 5 mm.

The center 12 has a weight of preferably 0.05 g or greater and 3 g or less. The temperature for crosslinking the center 12 is generally equal to or higher than 140° C. and equal to or lower than 180° C. The time period for crosslinking the center 12 is generally equal to or longer than 5 minutes and equal to or shorter than 60 minutes. The center 12 may be formed with two or more layers. The center 12 may have a rib on the surface thereof.

The core outer layer 14 is obtained by crosslinking a rubber composition. Examples of preferable base rubbers for use in the rubber composition include polybutadienes, polyisoprenes, styrene-butadiene copolymers, ethylene-propylene-diene copolymers and natural rubbers. In light of resilience performance, polybutadienes are preferred. When another rubber is used in combination with a polybutadiene, it is preferred if the polybutadiene is included as a principal component. Specifically, the proportion of the polybutadiene to the entire base rubber is preferably equal to or greater than 50% by weight and more preferably equal to or greater than 80% by weight. The proportion of cis-1,4 bonds in the polybutadiene is preferably equal to or greater than 40 mol % and more preferably equal to or greater than 80 mol %.

In order to crosslink the core outer layer 14, a co-crosslinking agent is preferably used. Examples of preferable co-crosslinking agents in light of resilience performance include monovalent or bivalent metal salts of an α,β-unsaturated carboxylic acid having 2 to 8 carbon atoms. Specific examples of preferable co-crosslinking agents include zinc acrylate, magnesium acrylate, zinc methacrylate and magnesium methacrylate. In light of resilience performance, zinc acrylate and zinc methacrylate are particularly preferred.

In light of resilience performance of the golf ball 2, the amount of the co-crosslinking agent is preferably equal to or greater than 10 parts by weight, more preferably equal to or greater than 15 parts by weight, and particularly preferably equal to or greater than 20 parts by weight, per 100 parts by weight of the base rubber. In light of soft feel at impact, the amount of the co-crosslinking agent is preferably equal to or less than 50 parts by weight, more preferably equal to or less than 45 parts by weight, and particularly preferably equal to or less than 40 parts by weight, per 100 parts by weight of the base rubber.

Preferably, the rubber composition of the core outer layer 14 includes an organic peroxide together with a co-crosslinking agent. The organic peroxide serves as a crosslinking initiator. The organic peroxide contributes to the resilience performance of the golf ball 2. Examples of suitable organic peroxides include dicumyl peroxide, 1,1-bis(t-butylperoxy)-3,3,5-trimethylcyclohexane, 2,5-dimethyl-2,5-di(t-butylperoxy)hexane and di-t-butyl peroxide. In light of versatility, dicumyl peroxide is preferred.

In light of resilience performance of the golf ball 2, the amount of the organic peroxide is preferably equal to or greater than 0.1 part by weight, more preferably equal to or greater than 0.3 part by weight, and particularly preferably equal to or greater than 0.5 part by weight, per 100 parts by weight of the base rubber. In light of soft feel at impact, the amount of the organic peroxide is preferably equal to or less than 3.0 parts by weight, more preferably equal to or less than 2.5 parts by weight, and particularly preferably equal to or less than 2.0 parts by weight, per 100 parts by weight of the base rubber.

Preferably, the rubber composition of the core outer layer 14 includes an organic sulfur compound. Examples of preferable organic sulfur compounds include monosubstitutions such as diphenyl disulfide, bis(4-chlorophenyl)disulfide, bis(3-chlorophenyl)disulfide, bis(4-bromophenyl)disulfide, bis(3-bromophenyl)disulfide, bis(4-fluorophenyl)disulfide, bis(4-iodophenyl)disulfide, and bis(4-cyanophenyl)disulfide; disubstitutions such as bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro-5-bromophenyl)disulfide and bis(2-cyano-5-bromophenyl)disulfide; trisubstitutions such as bis(2,4,6-trichlorophenyl)disulfide and bis(2-cyano-4-chloro-6-bromophenyl)disulfide; tetrasubstitutions such as bis(2,3,5,6-tetrachlorophenyl)disulfide; and pentasubstitutions such as bis(2,3,4,5,6-pentachlorophenyl)disulfide and bis(2,3,4,5,6-pentabromophenyl)disulfide. The organic sulfur compound contributes to the resilience performance. Particularly preferable organic sulfur compounds are diphenyl disulfide and bis(pentabromophenyl)disulfide.

In light of resilience performance of the golf ball 2, the amount of the organic sulfur compound is preferably equal to or greater than 0.1 part by weight and more preferably equal to or greater than 0.2 part by weight, per 100 parts by weight of the base rubber. In light of soft feel at impact, the amount of the organic sulfur compound is preferably equal to or less than 1.5 parts by weight, more preferably equal to or less than 1.0 part by weight, and particularly preferably equal to or less than 0.8 part by weight, per 100 parts by weight of the base rubber.

For the purpose of adjusting specific gravity and the like, a filler may be included in the core outer layer 14. Examples of suitable fillers include zinc oxide, barium sulfate, calcium carbonate and magnesium carbonate. Powder of a metal with a high specific gravity may be included as a filler. Specific examples of metals with a high specific gravity include tungsten and molybdenum. The amount of the filler is determined as appropriate so that the intended specific gravity of the core outer layer 14 is accomplished. A particularly preferable filler is zinc oxide. Zinc oxide serves not only as a specific gravity adjuster but also as a crosslinking activator. According to need, various additives such as sulfur, an anti-aging agent, a coloring agent, a plasticizer, a dispersant and the like are included in the core outer layer 14 in an adequate amount. Crosslinked rubber powder or synthetic resin powder may be also included in the core outer layer 14.

The hardness of the core outer layer 14 gradually increases from its innermost portion to its surface (i.e. the surface of the core 4). The core outer layer 14 has a low hardness H3 at its innermost portion and a great hardness H4 at its surface. The low hardness H3 can achieve the continuity of hardness between the center 12 and the core outer layer 14. The great hardness H4 achieves the outer-hard/inner-soft structure of the core 4. The core outer layer 14 sufficiently suppresses spin upon a shot with a driver.

In light of the resilience performance, the innermost portion hardness H3 is preferably equal to or greater than 45, more preferably equal to or greater than 55, and particularly preferably equal to or greater than 63. In light of continuity of the hardness distribution, the innermost portion hardness H3 is preferably equal to or less than 75, more preferably equal to or less than 70, and particularly preferably equal to or less than 67. The hardness H3 is measured for a hemisphere obtained by cutting the core 4. The hardness H3 is measured by pressing a JIS-C type hardness scale against the cut plane of the hemisphere. The hardness scale is pressed against a region surrounded by: a first circle that is the boundary between the center 12 and the core outer layer 14; and a second circle that is concentric with the first circle and has a radius 1 mm greater than the radius of the first circle. For the measurement, an automated rubber hardness measurement machine (trade name "P1", available from Kobunshi Keiki Co., Ltd.), to which this hardness scale is mounted, is used.

In light of achievement of an outer-hard/inner-soft structure, the surface hardness H4 of the core 4 is preferably equal to or greater than 65, more preferably equal to or greater than 75, even more preferably equal to or greater than 80, and particularly preferably equal to or greater than 85. In light of feel at impact, the hardness H4 is preferably equal to or less than 95, more preferably equal to or less than 93, even more preferably equal to or less than 92, and particularly preferably equal to or less than 90. The hardness H4 is measured by pressing a JIS-C type hardness scale against the surface of the core 4. For the measurement, an automated rubber hardness measurement machine (trade name "P1", available from Kobunshi Keiki Co., Ltd.), to which this hardness scale is mounted, is used.

In light of suppression of spin, the difference (H4−H3) between the surface hardness H4 of the core 4 and the innermost portion hardness H3 of the core outer layer 14 is preferably equal to or greater than 10, more preferably equal to or greater than 13, and particularly preferably equal to or greater than 14. In light of ease of production and durability, the difference (H4−H3) is preferably equal to or less than 25, more preferably equal to or less than 20, and particularly preferably equal to or less than 18.

In light of achievement of a great difference (H4−H3), the core outer layer 14 has a thickness of preferably 10 mm or greater, more preferably 12 mm or greater, and particularly preferably 14 mm or greater. The thickness is preferably equal to or less than 20 mm, more preferably equal to or less than 19 mm, and particularly preferably equal to or less than 18 mm.

During formation of the core outer layer 14, the center 12 is covered with two uncrosslinked or semi-crosslinked half shells. These half shells are compressed and heated. By this heating, a crosslinking reaction takes place to complete the core outer layer 14. The crosslinking temperature is generally equal to or higher than 140° C. and equal to or lower than 180° C. The time period for crosslinking the core outer layer 14 is generally equal to or longer than 10 minutes and equal to or shorter than 60 minutes.

In light of continuity of the hardness distribution, the difference (H3−H2) between the innermost portion hardness H3 of the core outer layer 14 and the surface hardness H2 of the center 12 is preferably equal to or less than 35, more preferably equal to or less than 30, and particularly preferably equal to or less than 28. The difference (H3−H2) may be zero.

In light of suppression of spin, the difference (H4−H1) between the surface hardness H4 of the core 4 and the central hardness H1 of the center 12 is preferably equal to or greater than 30, more preferably equal to or greater than 36, and particularly preferably equal to or greater than 41. In light of ease of production and durability, the difference (H4−H1) is preferably equal to or less than 65, more preferably equal to or less than 60, and particularly preferably equal to or less than 51.

In light of feel at impact, the core 4 has an amount of compressive deformation D2 of preferably 2.3 mm or greater, more preferably 2.6 mm or greater, and particularly preferably 2.8 mm or greater. In light of resilience performance, the amount of compressive deformation D2 is preferably equal to or less than 4.0 mm, more preferably equal to or less than 3.6 mm, and particularly preferably equal to or less than 3.2 mm.

In light of resilience performance, the core 4 has a diameter of preferably 28.0 mm or greater, more preferably 30.0 mm or greater, and particularly preferably 32.0 mm or greater. In light of durability of the golf ball 2, the diameter of the core 4 is preferably equal to or less than 40.2 mm, more preferably equal to or less than 39.9 mm, and particularly preferably equal to or less than 39.6 mm.

A resin composition is suitably used for the envelope layer 6. Examples of the base polymer of this resin composition include ionomer resins, polystyrenes, polyolefins, polyurethanes, polyesters and polyamides. Two or more polymers may be used in combination. Particularly, ionomer resins are preferred. Ionomer resins are highly elastic. As described later, the mid layer 8 and the cover 10 of the golf ball 2 are thin. When the golf ball 2 is hit with a driver, the envelope layer 6 significantly deforms due to the thinness of the mid layer 8 and the cover 10. The envelope layer 6 including an ionomer resin contributes to the resilience performance upon a shot with a driver.

Examples of preferable ionomer resins include binary copolymers formed with an α-olefin and an α,β-unsaturated carboxylic acid having 3 to 8 carbon atoms. A preferable binary copolymer includes 80% by weight or more and 90% by weight or less of an α-olefin, and 10% by weight or more and 20% by weight or less of an α,β-unsaturated carboxylic acid. This binary copolymer provides excellent resilience performance to the golf ball 2. Examples of other preferable ionomer resins include ternary copolymers formed with: an α-olefin; an α,β-unsaturated carboxylic acid having 3 to 8 carbon atoms; and an α,β-unsaturated carboxylate ester having 2 to 22 carbon atoms. A preferable ternary copolymer includes 70% by weight or more and 85% by weight or less of an α-olefin, 5% by weight or more and 30% by weight or less of an α,β-unsaturated carboxylic acid, and 1% by weight or more and 25% by weight or less of an α,β-unsaturated carboxylate ester. This ternary copolymer provides excellent resilience performance to the golf ball 2. For the binary copolymer and ternary copolymer, preferable α-olefins are ethylene and propylene, while preferable α,β-unsaturated carboxylic acids are acrylic acid and methacrylic acid. A particularly preferable ionomer resin is a copolymer formed with ethylene and acrylic acid or methacrylic acid.

In the binary copolymer and ternary copolymer, some of the carboxyl groups are neutralized with metal ions. Examples of metal ions for use in neutralization include sodium ion, potassium ion, lithium ion, zinc ion, calcium ion, magnesium ion, aluminum ion and neodymium ion. The neutralization may be carried out with two or more types of metal ions. Particularly suitable metal ions in light of resilience performance and durability of the golf ball 2 are sodium ion, zinc ion, lithium ion and magnesium ion.

Specific examples of ionomer resins include trade names "Himilan 1555", "Himilan 1557", "Himilan 1605", "Himilan 1706", "Himilan 1707", "Himilan 1856", "Himilan 1855", "Himilan AM7311", "Himilan AM7315", "Himilan AM7317", "Himilan AM7318", "Himilan MK7320" and "Himilan MK7329", available from Du Pont-MITSUI POLY-CHEMICALS Co., Ltd.; trade names "Surlyn 6120", "Surlyn 6320", "Surlyn 6910", "Surlyn 7930", "Surlyn 7940", "Surlyn 8140", "Surlyn 8150", "Surlyn 8940", "Surlyn 8945", "Surlyn 9120", "Surlyn 9150", "Surlyn 9910", "Surlyn 9945", "Surlyn AD8546", "HPF1000" and "HPF2000", available from E.I. du Pont de Nemours and Company; and trade names "IOTEK 7010", "IOTEK 7030", "IOTEK 7510", "IOTEK 7520", "IOTEK 8000" and "IOTEK 8030", available from ExxonMobil Chemical Corporation. Two or more types of ionomer resins may be used in combination. An ionomer resin neutralized with a monovalent metal ion, and an ionomer resin neutralized with a bivalent metal ion may be used in combination.

As described later, the envelope layer 6 is hard. Use of an ionomer resin having a high acid content achieves a hard envelope layer 6. The acid content is preferably equal to or greater than 10% by weight and equal to or less than 30% by weight. Specific examples of ionomer resins having a high acid content include the aforementioned "Himilan 1605", "Himilan 1706", "Himilan 1707", "Himilan AM7311", "Himilan AM7317", "Himilan AM7318", "Himilan AM7329", "Surlyn 6120", "Surlyn 6910", "Surlyn 7930", "Surlyn 7940", "Surlyn 8140", "Surlyn 8150", "Surlyn 8940", "Surlyn 8945", "Surlyn 9120", "Surlyn 9150", "Surlyn 9910", "Surlyn 9945", "Surlyn AD8546", "IOTEK 8000" and "IOTEK 8030".

An ionomer resin and another resin may be used in combination. In this case, in light of resilience performance, the ionomer resin is included as the principal component of the base polymer. The proportion of the ionomer resin to the entire base polymer is preferably equal to or greater than 50% by weight, more preferably equal to or greater than 70% by weight, and particularly preferably equal to or greater than 85% by weight.

A preferable resin that can be used in combination with an ionomer resin is a styrene block-containing thermoplastic elastomer. This elastomer can contribute to the feel at impact of the golf ball 2. This elastomer does not impair the resilience performance of the golf ball 2. This elastomer includes a polystyrene block as a hard segment, and a soft segment. A typical soft segment is a diene block. Examples of diene compounds include butadiene, isoprene, 1,3-pentadiene and 2,3-dimethyl-1,3-butadiene. Butadiene and isoprene are preferred. Two or more compounds may be used in combination.

Examples of styrene block-containing thermoplastic elastomers include styrene-butadiene-styrene block copolymers (SBS), styrene-isoprene-styrene block copolymers (SIS), styrene-isoprene-butadiene-styrene block copolymers (SIBS), hydrogenated SBS, hydrogenated SIS and hydrogenated SIBS. Examples of hydrogenated SBS include styrene-ethylene-butylene-styrene block copolymers (SEBS). Examples of hydrogenated SIS include styrene-ethylene-propylene-styrene block copolymers (SEPS). Examples of hydrogenated SIBS include styrene-ethylene-ethylene-propylene-styrene block copolymers (SEEPS).

In light of resilience performance of the golf ball 2, the content of the styrene component in the thermoplastic elastomer is preferably equal to or greater than 10% by weight, more preferably equal to or greater than 12% by weight, and particularly preferably equal to or greater than 15% by weight. In light of feel at impact of the golf ball 2, the content is preferably equal to or less than 50% by weight, more preferably equal to or less than 47% by weight, and particularly preferably equal to or less than 45% by weight.

In the present invention, styrene block-containing thermoplastic elastomers include alloys of olefin and one or more selected from the group consisting of SBS, SIS, SIBS, SEBS, SEPS, SEEPS, and hydrogenated products thereof. An olefin component in the alloy is presumed to contribute to the improvement of compatibility with ionomer resins. Use of this alloy improves the resilience performance of the golf ball 2. An olefin having 2 to 10 carbon atoms is preferably used. Examples of suitable olefins include ethylene, propylene, butene and pentene. Ethylene and propylene are particularly preferred.

Specific examples of polymer alloys include trade names "Rabalon T3221C", "Rabalon T3339C" "Rabalon SJ4400N", "Rabalon SJ5400N", "Rabalon SJ6400N", "Rabalon SJ7400N", "Rabalon SJ8400N", "Rabalon SJ9400N" and "Rabalon SR04", available from Mitsubishi Chemical Corporation. Other specific examples of styrene block-containing thermoplastic elastomers include a trade name "Epofriend A1010" available from Daicel Chemical Industries, Ltd., and a trade name "Septon HG-252" available from Kuraray Co., Ltd.

When an ionomer resin and a styrene block-containing thermoplastic elastomer are used in combination for the envelope layer 6, the weight ratio of them is preferably equal to or greater than 50/50 and equal to or less than 97/3. The envelope layer 6 with a weight ratio of 50/50 or greater contributes to the resilience performance of the golf ball 2. In this respect, the ratio is more preferably equal to or greater than 70/30 and particularly preferably equal to or greater than 85/15. The envelope layer 6 with a weight ratio of 97/3 or less contributes to the feel at impact of the golf ball 2. In this respect, the ratio is more preferably equal to or less than 95/10.

The envelope layer 6 is hard. The golf ball 2 with the hard envelope layer 6 has excellent resilience performance upon a shot with a driver. A sphere consisting of the hard envelope layer 6 and the core 4 can achieve an outer-hard/inner-soft hardness distribution. When the golf ball 2 having this hardness distribution is hit with a driver, the spin is suppressed. The synergistic effect of the resilience performance and the spin suppression achieves excellent flight performance of the golf ball 2. The golf ball 2 having this hardness distribution also has excellent feel at impact. In light of flight performance and feel at impact, the envelope layer 6 has a Shore D hardness H5 of preferably 50 or greater, more preferably 55 or greater, and particularly preferably 57 or greater. In light of feel at impact and durability, the hardness H5 is preferably equal to or less than 80, more preferably equal to or less than 75, and particularly preferably equal to or less than 72.

In the present invention, the hardness H5 of the envelope layer 6 is measured according to the standards of "ASTM-D 2240-68". For the measurement, an automated rubber hardness measurement machine (trade name "P1", available from Kobunshi Keiki Co., Ltd.), to which a Shore D type hardness scale is mounted, is used. For the measurement, a sheet, which is formed by hot press and made of the same material as the envelope layer 6 and which has a thickness of about 2 mm, is used. Prior to the measurement, the sheet is maintained at 23° C. for two weeks. At the measurement, three sheets are stacked.

In light of flight performance, the envelope layer 6 has a thickness Ts of preferably 0.5 mm or greater, more preferably 0.7 mm or greater, and particularly preferably 0.8 mm or greater. In light of feel at impact, the thickness Ts is preferably equal to or less than 2.2 mm, more preferably equal to or less than 1.5 mm, and particularly preferably equal to or less than 1.2 mm.

According to need, a coloring agent such as titanium dioxide, a filler such as barium sulfate, a dispersant, an antioxidant, an ultraviolet absorber, a light stabilizer, a fluorescent material, a fluorescent brightener and the like are included in the envelope layer 6 in an adequate amount. For the purpose of adjusting specific gravity, powder of a metal with a high specific gravity such as tungsten, molybdenum and the like may be included in the envelope layer 6.

For forming the envelope layer 6, known methods such as injection molding, compression molding and the like can be used. In light of productivity, injection molding is preferred.

In light of feel at impact, the sphere consisting of the core 4 and the envelope layer 6 has an amount of compressive deformation D3 of preferably 2.0 mm or greater, more preferably 2.2 mm or greater, and particularly preferably 2.4 mm or greater. In light of resilience performance, the amount of compressive deformation D3 is preferably equal to or less than 3.6 mm, more preferably equal to or less than 3.4 mm, and particularly preferably equal to or less than 3.2 mm.

The mid layer 8 is formed from a resin composition. Examples of the base polymer of this resin composition include polyurethanes, polyesters, polyamides, polyolefins, polystyrenes and ionomer resins. Two or more polymers may be used in combination. Particularly, polyurethanes are preferred. Polyurethanes are flexible. When the golf ball 2 with the mid layer 8 including a polyurethane is hit with a short iron, the spin rate is high. The mid layer 8 formed from a polyurethane contributes to the controllability upon a shot with a short iron.

When the golf ball 2 is hit with a driver, a long iron, or a middle iron, the sphere consisting of the core 4 and the envelope layer 6 becomes significantly distorted because the head speed is high. Because this sphere has the outer-hard/inner-soft structure as described above, the spin is suppressed. When the golf ball 2 is hit with a short iron, this sphere becomes less distorted because the head speed is low. When the golf ball 2 is hit with a short iron, the behavior of the golf ball 2 mainly depends on the mid layer 8 and the cover 10. Because of the mid layer 8 including the polyurethane, a high spin rate is obtained when the golf ball 2 is hit with a short iron, even though the above sphere has the outer-hard/inner-soft structure. This high spin rate achieves excellent controllability.

A polyurethane and another resin may be used in combination for the mid layer 8. In this case, in light of spin performance and feel at impact, the polyurethane is included as the principal component of the base polymer. The proportion of the polyurethane to the entire base polymer is preferably equal to or greater than 50% by weight, more preferably equal to or greater than 70% by weight, and particularly preferably equal to or greater than 85% by weight.

For the mid layer 8, thermoplastic polyurethanes and thermosetting polyurethanes can be used. In light of productivity, thermoplastic polyurethanes are preferred. A thermoplastic polyurethane includes a polyurethane component as a hard segment, and a polyester component or a polyether component as a soft segment. Examples of the curing agent for the polyurethane component include alicyclic diisocyanates, aromatic diisocyanates and aliphatic diisocyanates.

Examples of alicyclic diisocyanates include 4,4'-dicyclohexylmethane diisocyanate ($H_{12}MDI$), 1,3-bis(isocyanatemethyl)cyclohexane ($H_6XDI$), isophorone diisocyanate (IPDI) and trans-1,4-cyclohexane diisocyanate (CHDI). In light of versatility and processability, $H_{12}MDI$ is preferred.

Examples of aromatic diisocyanates include 4,4'-diphenylmethane diisocyanate (MDI) and toluene diisocyanate (TDI). One example of aliphatic diisocyanates is hexamethylene diisocyanate (HDI).

Specific examples of thermoplastic polyurethanes include trade names "Elastollan XNY80A", "Elastollan XNY85A", "Elastollan XNY90A", "Elastollan XNY97A", "Elastollan XNY585" and "Elastollan XKP016N", available from BASF Japan Ltd.; and trade names "RESAMINE P4585LS" and "RESAMINE PS62490", available from Dainichiseika Color & Chemicals Mfg. Co., Ltd.

The mid layer 8 may be formed from a composition including a thermoplastic polyurethane and a isocyanate compound. During or after forming the mid layer 8, the polyurethane is crosslinked with the isocyanate compound.

The mid layer 8 has a Shore D hardness H6 of 60 or less. Use of the flexible mid layer 8 can achieve excellent controllability upon a shot with a short iron. In light of controllability, the hardness H6 is more preferably equal to or less than 57, even more preferably equal to or less than 54, and particularly preferably equal to or less than 47. If the hardness H6 is excessively low, the flight performance upon a shot with a driver is insufficient. In this respect, the hardness H6 is preferably equal to or greater than 30, more preferably equal to or greater than 35, and particularly preferably equal to or greater than 38. The hardness H6 of the mid layer 8 is measured by the same method as that for the hardness H5 of the envelope layer 6.

The mid layer 8 has a thickness Tm of 1.2 mm or less. As described above, the mid layer 8 is flexible. The mid layer 8 is disadvantageous to the resilience coefficient of the golf ball 2. Upon a shot with a driver, the core 4 and the envelope layer 6 also deform significantly. By setting the thickness Tm to be equal to or less than 1.2 mm, the mid layer 8 does not have a significantly adverse effect on the resilience coefficient upon a shot with a driver, even if the mid layer 8 is flexible. The mid layer 8 with a thickness Tm of 1.2 mm or less does not impair the flight performance of the golf ball 2. In light of flight performance, the thickness Tm is more preferably equal to or less than 1.0 mm and particularly preferably equal to or less than 0.8 mm. In light of controllability upon a shot with a short iron, the thickness Tm is preferably equal to or greater than 0.1 mm, more preferably equal to or greater than 0.2 mm, and particularly preferably equal to or greater than 0.3 mm.

According to need, a coloring agent such as titanium dioxide, a filler such as barium sulfate, a dispersant, an antioxidant, an ultraviolet absorber, a light stabilizer, a fluorescent material, a fluorescent brightener and the like are included in the mid layer 8 in an adequate amount.

For forming the mid layer 8, known methods such as injection molding, compression molding, cast molding and the like can be used. The mid layer 8 may be formed by applying the solution or dispersion liquid of the resin composition to the surface of the envelope layer 6.

In light of feel at impact, the sphere consisting of the core 4, the envelope layer 6 and the mid layer 8 has an amount of compressive deformation D4 of preferably 2.3 mm or greater, more preferably 2.4 mm or greater, and particularly preferably 2.5 mm or greater. In light of resilience performance, the amount of compressive deformation D4 is preferably equal to or less than 4.0 mm, more preferably equal to or less than 3.9 mm, and particularly preferably equal to or less than 3.8 mm.

The cover 10 is formed from a resin composition. Examples of the base polymer of this resin composition include polyurethanes, polyesters, polyamides, polyolefins, polystyrenes and ionomer resins. Two or more polymers may be used in combination. Particularly, polyurethanes are preferred. Polyurethanes are flexible. When the golf ball 2 with the cover 10 including a polyurethane is hit with a short iron, the spin rate is high. The cover 10 formed from a polyurethane contributes to the controllability upon a shot with a short iron. The polyurethane also contributes to the scuff resistance of the cover 10.

When the golf ball 2 is hit with a driver, a long iron, or a middle iron, the sphere consisting of the core 4 and the envelope layer 6 becomes significantly distorted because the head speed is high. Because this sphere has an outer-hard/inner-soft structure as described above, the spin is suppressed. When the golf ball 2 is hit with a short iron, this sphere becomes less distorted because the head speed is low. When the golf ball 2 is hit with a short iron, the behavior of the golf ball 2 mainly depends on the mid layer 8 and the cover 10. Because of the cover 10 including the polyurethane, a high spin rate is obtained when the golf ball 2 is hit with a short iron, even though the above sphere has the outer-hard/inner-soft structure. This high spin rate achieves excellent controllability.

A polyurethane and another resin may be used in combination for the cover 10. In this case, in light of spin performance and feel at impact, the polyurethane is included as the principal component of the base polymer. The proportion of the polyurethane to the entire base polymer is preferably equal to or greater than 50% by weight, more preferably equal to or greater than 70% by weight, and particularly preferably equal to or greater than 85% by weight.

For the cover 10, thermoplastic polyurethanes and thermosetting polyurethanes can be used. In light of productivity, thermoplastic polyurethanes are preferred. The thermoplastic polyurethanes described above for the mid layer 8 can be used for the cover 10. Polyurethanes each including a polyurethane component for which an alicyclic diisocyanate is used as the curing agent are particularly preferred. An alicyclic diisocyanate does not have any double bond in the main chain. In the cover 10 formed from a polyurethane for which an alicyclic diisocyanate is used as the curing agent, yellowing of the cover 10 is suppressed. In addition, because the polyurethane for which an alicyclic diisocyanate is used as the curing agent has excellent strength, the cover 10 is prevented from being damaged.

The cover 10 may be formed from a composition including a thermoplastic polyurethane and an isocyanate compound. During or after forming the cover 10, the polyurethane is crosslinked with the isocyanate compound.

The cover 10 has a Shore D hardness H7 less than 40. Use of the flexible cover 10 can achieve excellent controllability upon a shot with a short iron. In light of controllability, the hardness H7 is more preferably equal to or less than 38 and particularly preferably equal to or less than 36. If the hardness H7 is excessively low, the flight performance upon a shot with a driver is insufficient. In this respect, the hardness H7 is preferably equal to or greater than 10, more preferably equal to or greater than 15, and particularly preferably equal to or greater than 20. The hardness H7 of the cover 10 is measured by the same method as that for the hardness H5 of the envelope layer 6.

The cover 10 has a thickness Tc of 0.6 mm or less. As described above, the cover 10 is flexible. The cover 10 is disadvantageous to the resilience coefficient of the golf ball 2. Upon a shot with a driver, the core 4 and the envelope layer 6 also deform significantly. By setting the thickness Tc to be equal to or less than 0.6 mm, the cover 10 does not have a significantly adverse effect on the resilience coefficient upon a shot with a driver, even if the cover 10 is flexible. The cover 10 with a thickness Tc of 0.6 mm or less does not impair the flight performance of the golf ball 2. In light of flight performance, the thickness Tc is more preferably equal to or less than 0.5 mm and particularly preferably equal to or less than 0.4 mm. In light of controllability upon a shot with a short iron, the thickness Tc is preferably equal to or greater than 0.1 mm, more preferably equal to or greater than 0.2 mm, and particularly preferably equal to or greater than 0.3 mm.

According to need, a coloring agent such as titanium dioxide, a filler such as barium sulfate, a dispersant, an antioxidant, an ultraviolet absorber, a light stabilizer, a fluorescent material, a fluorescent brightener and the like are included in the cover 10 in an adequate amount.

For forming the cover 10, known methods such as injection molding, compression molding, cast molding and the like can be used. When forming the cover 10, the dimples 16 are formed by pimples formed on the cavity face of a mold. The cover 10 may be formed by applying the solution or dispersion liquid of the resin composition to the surface of the mid layer 8. A sphere with the cover 10 having a smooth surface from the above application may be formed, and is placed into a mold to form the dimples 16 thereon.

The golf ball 2 satisfies the following mathematical formula.

$$H5 > H6 \geq H7 \qquad (I)$$

H5: Shore D hardness of the envelope layer 6
H6: Shore D hardness of the mid layer 8
H7: Shore D hardness of the cover 10

In the golf ball 2, the hardness H5 of the envelope layer 6 is great. The envelope layer 6 achieves an outer-hard/inner-soft structure. The envelope layer 6 suppresses the spin when the golf ball 2 is hit with a driver. The envelope layer 6 contributes to the flight performance upon a shot with a driver. In the golf ball 2, the hardness H6 of the mid layer 8 and the hardness H7 of the cover 10 are low. When the golf ball 2 with the mid layer 8 and the cover 10 is hit with a short iron, a high spin rate is obtained. The cover 10 contributes to the controllability upon a shot with a short iron.

Preferably, the golf ball 2 satisfies the following mathematical formula (II).

$$H5 > H6 > H7 \qquad (II)$$

In other words, in the golf ball 2, the hardness H6 of the mid layer 8 is greater than the hardness H7 of the cover 10. As described above, the base polymer of the mid layer 8 is a polyurethane, and the base polymer of the cover 10 is also a polyurethane. By using different types of polyurethanes for the mid layer 8 and the cover 10, the golf ball 2 in which the hardness H6 is greater than the hardness H7 is obtained. If the mid layer 8 is not provided, the hardness distribution has a great step at the boundary between the envelope layer 6 and the cover 10. In the golf ball 2 with the mid layer 8 in which the hardness H6 is less than the hardness H5 of the envelope layer 6 and greater than the hardness H7 of the cover 10, the hardness distribution does not have such a great step. The mid layer 8 contributes to the feel at impact. The golf ball 2 has excellent flight performance, excellent controllability and excellent feel at impact.

In light of feel at impact, the golf ball 2 has an amount of compressive deformation D5 of preferably 2.0 mm or greater, more preferably 2.2 mm or greater, and particularly preferably 2.4 mm or greater. In light of resilience performance, the amount of compressive deformation D5 is preferably equal to or less than 3.3 mm, more preferably equal to or less than 3.1 mm, and particularly preferably equal to or less than 2.9 mm.

In light of flight performance, controllability and feel at impact, the difference (H5−H6) between the hardness H5 and the hardness H6 is preferably equal to or greater than 5 and equal to or less than 40, more preferably equal to or greater than 10 and equal to or less than 35, and particularly preferably equal to or greater than 15 and equal to or less than 30.

In light of flight performance, controllability and feel at impact, the difference (H6−H7) between the hardness H6 and the hardness H7 is preferably equal to or greater than 3 and equal to or less than 28, more preferably equal to or greater than 6 and equal to or less than 25, and particularly preferably equal to or greater than 9 and equal to or less than 21.

In light of flight performance upon a shot with a driver, the sum (Tm+Tc) of the thickness Tm of the mid layer 8 and the thickness Tc of the cover 10 is preferably equal to or less than 1.6 mm, more preferably equal to or less than 1.5 mm, and particularly preferably equal to or less than 1.4 mm. In light of ease of producing the mid layer 8 and the cover 10, the sum (Tm+Tc) is preferably equal to or greater than 0.2 mm and more preferably equal to or greater than 0.3 mm.

The golf ball 2 may include a reinforcing layer between the envelope layer 6 and the mid layer 8. The reinforcing layer firmly adheres to the envelope layer 6 and also to the mid layer 8. The reinforcing layer prevents separation of the mid layer 8 from the envelope layer 6.

As the base polymer of the reinforcing layer, a two-component curing type thermosetting resin is suitably used. Examples of two-component curing type thermosetting resins include epoxy resins, urethane resins, acrylic resins, polyester resins and cellulose resins. In light of strength and durability of the reinforcing layer, two-component curing type epoxy resins and two-component curing type urethane resins are preferred.

The reinforcing layer may include additives such as a coloring agent (typically, titanium dioxide), a phosphate-based stabilizer, an antioxidant, a light stabilizer, a fluorescent brightener, an ultraviolet absorber, an anti-blocking agent and the like. The additives may be added to the base material of the two-component curing type thermosetting resin, or may be added to the curing agent of the two-component curing type thermosetting resin.

The reinforcing layer is obtained by applying, to the surface of the envelope layer 6, a liquid that is prepared by dissolving or dispersing the base material and the curing agent in a solvent. In light of workability, application with a spray gun is preferred. After the application, the solvent is volatilized to permit a reaction of the base material with the curing agent, thereby forming the reinforcing layer.

In light of adhesion, the reinforcing layer has a thickness of preferably 3 μm or greater and more preferably 5 μm or greater. In light of ease of forming the reinforcing layer, the thickness is preferably equal to or less than 300 μm, more preferably equal to or less than 50 μm, and particularly preferably equal to or less than 20 μm. The thickness is measured by observing a cross section of the golf ball 2 with a microscope. When the envelope layer 6 has concavities and convexities on its surface from surface roughening, the thickness of the reinforcing layer is measured at a convex part.

In light of adhesion, the reinforcing layer has a pencil hardness of preferably 4B or harder and more preferably B or harder. In light of reduced loss of the power transmission from the mid layer 8 to the envelope layer 6 upon a hit of the golf ball 2, the reinforcing layer has a pencil hardness of preferably 3H or softer. The pencil hardness is measured according to the standards of "JIS K5400".

EXAMPLES

Example 1

A rubber composition (1) was obtained by kneading 100 parts by weight of a high-cis polybutadiene (trade name "BR-730", available from JSR Corporation), 5 parts by weight of zinc oxide, an appropriate amount of barium sulfate, 10 parts by weight of silica (trade name "Nipsil AQ", available from Tosoh Silica Corporation), 3.4 parts by weight of sulfur, 2.20 parts by weight of a vulcanization accelerator (the aforementioned "Nocceler CZ"), and 2.26 parts by weight of another vulcanization accelerator (the aforementioned "Soxinol DG"). This rubber composition (1) was placed into a mold including upper and lower mold halves each having a hemispherical cavity, and heated at 150° C. for 5 minutes to obtain a center with a diameter of 5.0 mm.

A rubber composition (4) was obtained by kneading 100 parts by weight of a high-cis polybutadiene (the aforementioned "BR-730"), 37 parts by weight of zinc diacrylate, 5 parts by weight of zinc oxide, an appropriate amount of barium sulfate, 0.5 part by weight of diphenyl disulfide, and 0.8 part by weight of dicumyl peroxide (available from NOF Corporation). Two half shells were formed from this rubber composition (4). The center was covered with the two half shells. The center and the half shells were placed into a mold including upper and lower mold halves each having a hemispherical cavity, and heated at 170° C. for 20 minutes to obtain a core with a diameter of 39.5 mm. The amount of barium sulfate was adjusted such that the specific gravity of a mid layer agreed with the specific gravity of the center and the weight of a golf ball was 45.4 g.

A resin composition (d) was obtained by kneading 50 parts by weight of an ionomer resin (the aforementioned "Himilan 1605"), 50 parts by weight of another ionomer resin (the aforementioned "Himilan AM7329"), and 14 parts by weight of titanium dioxide with a twin-screw kneading extruder. The core was placed into a mold including upper and lower mold halves each having a hemispherical cavity. The core was covered with the resin composition (d) by injection molding to form an envelope layer with a thickness of 1.0 mm.

A paint composition (trade name "POLIN 750LE", available from SHINTO PAINT CO., LTD.) including a two-component curing type epoxy resin as a base polymer was prepared. The base material liquid of this paint composition includes 30 parts by weight of a bisphenol A type solid epoxy resin and 70 parts by weight of a solvent. The curing agent liquid of this paint composition includes 40 parts by weight of a modified polyamide amine, 55 parts by weight of a solvent, and 5 parts by weight of titanium oxide. The weight ratio of the base material liquid to the curing agent liquid is 1/1. This paint composition was applied to the surface of the envelope layer with a spray gun, and maintained at 23° C. for 24 hours to obtain a reinforcing layer with a thickness of 10 μm.

A resin composition (b) was obtained by kneading 100 parts by weight of a thermoplastic polyurethane elastomer (the aforementioned "Elastollan XNY90A") and 4 parts by weight of titanium dioxide with a twin-screw kneading extruder. Two half shells were obtained from this resin composition (b) by compression molding. The sphere consisting of the core, the envelope layer and the reinforcing layer was covered with these two half shells. The half shells and the sphere were placed into a mold including upper and lower mold halves each having a hemispherical cavity, and compression molding was performed to form a mid layer with a thickness of 0.3 mm.

A resin composition (c) was obtained by kneading 100 parts by weight of a thermoplastic polyurethane elastomer (the aforementioned "Elastollan XNY80A") and 4 parts by weight of titanium dioxide with a twin-screw kneading extruder. Two half shells were obtained from this resin composition (c) by compression molding. The sphere consisting of the core, the envelope layer, the reinforcing layer and the mid layer was covered with these two half shells. The half shells and the sphere were placed into a final mold that includes upper and lower mold halves each having a hemispherical cavity and that has a large number of pimples on its cavity face, and compression molding was performed to form a cover with a thickness of 0.3 mm. A large number of dimples having a shape that is the inverted shape of the pimples were formed on the cover. A clear paint including a two-component curing type polyurethane as a base material was applied to this cover to obtain a golf ball of Example 1 with a diameter of 42.7 mm and a weight of about 45.4 g.

Examples 2 to 5 and Comparative Examples 1 to 6

Golf balls of Examples 2 to 5 and Comparative Examples 1 to 6 were obtained in a similar manner as Example 1, except the specifications of the center, the core outer layer, the envelope layer, the mid layer and the cover were as shown in the following Tables 3 to 5. The rubber composition of the core is shown in detail in the following Table 1. The resin compositions of the envelope layer, the mid layer and the cover are shown in detail in the following Table 2. The golf ball of Comparative Example 1 does not have a core outer layer.

[Shot with Driver (W#1)]

A driver with a titanium head (trade name "SRIXON W505", available from SRI Sports Limited, shaft hardness: X, loft angle: 8.5°) was attached to a swing machine available from Golf Laboratories, Inc. A golf ball was hit under the condition of a head speed of 50 m/sec, and the distance from the launch point to the stop point was measured. In addition, the backspin rate was measured immediately after the hit. The average value of data obtained by 12 measurements is shown in the following Tables 3 to 5.

[Shot with Sand Wedge (SW)]

A sand wedge was attached to a swing machine available from True Temper Co. A golf ball was hit under the condition of a head speed of 21 m/sec, and the backspin rate was measured. The average value of data obtained by 12 measurements is shown in the following Tables 3 to 5.

[Feel at Impact]

Ten golf players hit golf balls with drivers, and were asked about feel at impact. The evaluation was categorized as follows based on the number of golf players who answered, "the impact shock was small and the feel at impact was excellent".

A: 8 or more
B: 6 to 7
C: 4 to 5
D: 3 or less

The results are shown in the following Tables 3 to 5.

TABLE 1

Composition of Core

| | (1) | (2) | (3) | (4) |
|---|---|---|---|---|
| | | | | (parts by weight) |
| Polybutadiene | 100 | 100 | 100 | 100 |
| Zinc diacrylate | — | — | 15 | 37 |
| Zinc oxide | 5 | 5 | 5 | 5 |
| Barium sulfate | Appropriate amount | Appropriate amount | Appropriate amount | Appropriate amount |
| Silica | 10 | 30 | — | — |
| Diphenyl disulfide | — | — | 0.5 | 0.5 |
| Dicumyl peroxide | — | — | 0.7 | 0.7 |
| Sulfur | 3.4 | 3.4 | — | — |
| Accelerator CZ | 2.20 | 2.20 | — | — |
| Accelerator DG | 2.26 | 2.26 | — | — |

TABLE 2

Compositions of Envelope Layer, Mid Layer and Cover

| | (a) | (b) | (c) | (d) | (e) |
|---|---|---|---|---|---|
| | | | | | (parts by weight) |
| Elastollan XNY97A | 100 | — | — | — | — |
| Elastollan XNY90A | — | 100 | — | — | — |
| Elastollan XNY80A | — | — | 100 | — | — |
| Himilan 1605 | — | — | — | 50 | — |
| Himilan AM7329 | — | — | — | 50 | — |
| Himilan 1555 | — | — | — | — | 46 |
| Himilan 1557 | — | — | — | — | 46 |
| Rabalon T3221C | — | — | — | — | 8 |
| Titanium dioxide | 4 | 4 | 4 | 14 | 4 |
| Hardness (Shore-D) | 47 | 38 | 26 | 67 | 57 |

TABLE 3

Results of Evaluation

| | | Example 1 | Example 2 | Example 3 | Example 4 |
|---|---|---|---|---|---|
| Center | Composition | (1) | (2) | (1) | (2) |
| | Diameter (mm) | 5 | 10 | 5 | 10 |
| | Central hardness H1 (JIS C) | 30 | 40 | 30 | 40 |
| | Surface hardness H2 (JIS C) | 35 | 47 | 35 | 47 |
| | Crosslinking temperature (° C.) | 150 | 150 | 150 | 150 |
| | Crosslinking time (min) | 5 | 5 | 5 | 5 |
| Core outer layer | Composition | (4) | (4) | (4) | (4) |
| | Thickness (mm) | 17.25 | 14.75 | 17.25 | 14.75 |
| | Innermost hardness H3 (JIS C) | 63 | 67 | 63 | 67 |
| | Crosslinking temperature (° C.) | 170 | 170 | 170 | 170 |
| | Crosslinking time (min) | 20 | 20 | 20 | 20 |
| Core | Surface hardness H4 (JIS C) | 81 | 81 | 81 | 81 |
| | Difference (H3 − H2) | 28 | 20 | 28 | 20 |
| | Difference (H4 − H1) | 51 | 41 | 51 | 41 |
| | Difference (H4 − H3) | 18 | 14 | 18 | 14 |
| | Compressive deformation D2 (mm) | 3.0 | 3.0 | 3.0 | 3.0 |
| Envelope layer | Composition | (d) | (d) | (d) | (e) |
| | Thickness Ts (mm) | 1.0 | 0.8 | 0.8 | 1.2 |
| | Hardness H5 (Shore D) | 67 | 67 | 67 | 57 |

TABLE 3-continued

Results of Evaluation

|  |  | Example 1 | Example 2 | Example 3 | Example 4 |
|---|---|---|---|---|---|
| Mid layer | Composition | (b) | (a) | (a) | (a) |
|  | Thickness Tm (mm) | 0.3 | 0.3 | 0.5 | 0.2 |
|  | Hardness H6 (Shore D) | 38 | 47 | 47 | 47 |
| Cover | Composition | (c) | (b) | (c) | (c) |
|  | Thickness Tc (mm) | 0.3 | 0.5 | 0.3 | 0.2 |
|  | Hardness H7 (Shore D) | 26 | 38 | 26 | 26 |
| Ball | Compressive deformation D5 (mm) | 2.6 | 2.7 | 2.7 | 2.8 |
| W#1 | Spin (rpm) | 2100 | 2100 | 2150 | 2400 |
|  | Flight distance (m) | 278.5 | 278.0 | 277.5 | 274.0 |
| SW | Spin (rpm) | 7000 | 6900 | 6950 | 7150 |
| Feel at impact |  | A | A | A | A |

TABLE 4

Results of Evaluation

|  |  | Example 5 | Compa. Example 1 | Compa. Example 2 | Compa. Example 3 |
|---|---|---|---|---|---|
| Center | Composition | (1) | (2) | (4) | (1) |
|  | Diameter (mm) | 5 | 20 | 39.5 | 5 |
|  | Central hardness H1 (JIS C) | 30 | 40 | 62 | 30 |
|  | Surface hardness H2 (JIS C) | 35 | 51 | 81 | 35 |
|  | Crosslinking temperature (° C.) | 150 | 150 | 170 | 150 |
|  | Crosslinking time (min) | 5 | 5 | 20 | 5 |
| Core outer layer | Composition | (4) | (4) | — | (4) |
|  | Thickness (mm) | 17.25 | 9.75 | — | 17.25 |
|  | Innermost hardness H3 (JIS C) | 63 | 72 | — | 63 |
|  | Crosslinking temperature (° C.) | 170 | 170 | — | 170 |
|  | Crosslinking time (min) | 20 | 20 | — | 20 |
| Core | Surface hardness H4 (JIS C) | 81 | 81 | 81 (H2) | 81 |
|  | Difference (H3 − H2) | 28 | 21 | — | 28 |
|  | Difference (H4 − H1) | 51 | 41 | 19 | 51 |
|  | Difference (H4 − H3) | 18 | 9 | — | 18 |
|  | Compressive deformation D2 (mm) | 3.0 | 2.95 | 2.9 | 3.0 |
| Envelope layer | Composition | (d) | (d) | (d) | (d) |
|  | Thickness Ts (mm) | 1.0 | 0.8 | 0.9 | 0.8 |
|  | Hardness H5 (Shore D) | 67 | 67 | 67 | 67 |
| Mid layer | Composition | (b) | (b) | (a) | (e) |
|  | Thickness Tm (mm) | 0.3 | 0.2 | 0.3 | 0.6 |
|  | Hardness H6 (Shore D) | 38 | 38 | 47 | 57 |
| Cover | Composition | (b) | (c) | (c) | (a) |
|  | Thickness Tc (mm) | 0.3 | 0.6 | 0.4 | 0.2 |
|  | Hardness H7 (Shore D) | 38 | 26 | 38 | 47 |
| Ball | Compressive deformation D5 (mm) | 2.6 | 2.6 | 2.6 | 2.5 |
| W#1 | Spin (rpm) | 2050 | 2450 | 2450 | 2050 |
|  | Flight distance (m) | 279.0 | 273.5 | 273.5 | 279.5 |
| SW | Spin (rpm) | 6900 | 7250 | 7200 | 6650 |
| Feel at impact |  | A | A | A | C |

TABLE 5

Results of Evaluation

|  |  | Compa. Example 4 | Compa. Example 5 | Compa. Example 6 |
|---|---|---|---|---|
| Center | Composition | (2) | (1) | (2) |
|  | Diameter (mm) | 10 | 5 | 23 |
|  | Central hardness H1 (JIS C) | 40 | 30 | 41 |
|  | Surface hardness H2 (JIS C) | 47 | 35 | 52 |
|  | Crosslinking temperature (° C.) | 150 | 150 | 150 |
|  | Crosslinking time (min) | 5 | 5 | 5 |
| Core outer layer | Composition | (4) | (4) | (4) |
|  | Thickness (mm) | 14.75 | 17.25 | 8.25 |
|  | Innermost hardness H3 (JIS C) | 67 | 63 | 73 |
|  | Crosslinking temperature (° C.) | 170 | 170 | 170 |
|  | Crosslinking time (min) | 20 | 20 | 20 |

TABLE 5-continued

Results of Evaluation

|  |  | Compa. Example 4 | Compa. Example 5 | Compa. Example 6 |
|---|---|---|---|---|
| Core | Surface hardness H4 (JIS C) | 81 | 81 | 81 |
|  | Difference (H3 − H2) | 20 | 28 | 21 |
|  | Difference (H4 − H1) | 41 | 51 | 40 |
|  | Difference (H4 − H3) | 14 | 18 | 8 |
|  | Compressive deformation D2 (mm) | 3.0 | 3.0 | 2.95 |
| Envelope layer | Composition | (e) | (d) | (d) |
|  | Thickness Ts (mm) | 0.8 | 1.2 | 0.8 |
|  | Hardness H5 (Shore D) | 57 | 67 | 67 |
| Mid layer | Composition | (d) | — | (b) |
|  | Thickness Tm (mm) | 0.6 | — | 0.2 |
|  | Hardness H6 (Shore D) | 67 | — | 38 |
| Cover | Composition | (c) | (b) | (c) |
|  | Thickness Tc (mm) | 0.2 | 0.4 | 0.6 |
|  | Hardness H7 (Shore D) | 26 | 38 | 26 |
| Ball | Compressive deformation D5 (mm) | 2.5 | 2.5 | 2.6 |
| W#1 | Spin (rpm) | 2200 | 2000 | 2500 |
|  | Flight distance (m) | 276.0 | 279.5 | 273.0 |
| SW | Spin (rpm) | 6800 | 6700 | 7300 |
| Feel at impact |  | C | C | A |

As shown in Tables 3 to 5, the golf balls of Examples are excellent for all the evaluation items. From the results of evaluation, advantages of the present invention are clear.

The golf ball according to the present invention can be used for playing golf on a golf course and practicing at a driving range. The above description is merely for illustrative examples, and various modifications can be made without departing from the principles of the present invention.

What is claimed is:

1. A golf ball comprising a core, an envelope layer positioned outside the core, a mid layer positioned outside the envelope layer, and a cover positioned outside the mid layer, wherein:
   the core includes a center and a core outer layer positioned outside the center;
   the core surface JIS-C hardness H4 is greater than the core outer layer JIS-C hardness H3 at its innermost portion by an amount that is equal to or greater than 10; and
   the envelope Shore D hardness H5, the mid layer Shore D hardness H6 and the cover Shore D hardness H7 satisfy the following mathematical formula: H5>H6≥H7.

2. The golf ball according to claim 1, wherein the center has a diameter of 1 mm or greater than 15 mm or less.

3. The golf ball according to claim 1, wherein the envelope layer has a thickness of 0.5 mm or greater and 2.2 mm or less.

4. The golf ball according to claim 1, wherein the mid layer has a thickness of 0.1 mm or greater than 1.2 mm or less.

5. The golf ball according to claim 1, wherein the mid layer Shore D hardness H6 and the cover Shore D hardness H7 satisfy the following mathematical formula: H6>H7.

6. The golf ball according to claim 5, wherein the hardness H7 is equal to or less than 40.

7. The golf ball according to claim 1, wherein the center JIS-C hardness H2 at its surface is greater than the center JIS-C hardness H1 at its central point by an amount that is equal to or less than 15.

8. The golf ball according to claim 1, wherein the envelope layer has a first thickness, the mid layer has a second thickness, and the cover has a third thickness, and wherein the second thickness is no greater than the first thickness, and the second thickness is no greater than the third thickness.

9. A golf ball comprising a core, an envelope layer positioned outside the core, a mid layer positioned outside the envelope layer, and a cover positioned outside the mid layer, wherein:
   the core includes a center and a core outer layer positioned outside the center;
   the core has a diameter of 28.0 mm or greater and 40.2 mm or less;
   the core outer layer JIS-C hardness H3 at its innermost portion is greater than the center JIS-C hardness H2 at its surface by an amount that is equal to or less than 35; and
   the envelope layer Shore D hardness H5, the mid layer Shore D hardness H6 and the cover Shore D hardness H7 satisfy the following mathematical formula: H5>H6>H7.

10. The golf ball according to claim 9, wherein the center JIS-C hardness H2 at its surface is greater than the center JIS-C hardness H1 at its central point by an amount that is equal to or less than 15.

11. A golf ball comprising a core, a mid layer positioned outside the core, a cover positioned outside the mid layer and at least one layer positioned between the cover and the core wherein:
   the core includes a center and a core outer layer positioned outside the center;
   the core outer layer JIS-C hardness H3 at its innermost portion is greater than the center JIS-C hardness H2 at its surface by an amount that is equal to or less than 35; and
   the envelope layer Shore D hardness H5, the mid layer Shore D hardness H6 and the cover Shore D hardness H7 satisfy the following mathematical formula: H5>H6>H7.

* * * * *

UNITED STATES PATENT AND TRADEMARK OFFICE
CERTIFICATE OF CORRECTION

| | | |
|---|---|---|
| PATENT NO. | : 9,186,555 B2 | Page 1 of 1 |
| APPLICATION NO. | : 13/454486 | |
| DATED | : November 17, 2015 | |
| INVENTOR(S) | : Kazuya Kamino et al. | |

It is certified that error appears in the above-identified patent and that said Letters Patent is hereby corrected as shown below:

IN THE CLAIMS:

In claim 11, at column 24, lines numbered 47-50, correct the preamble so that claim 11 reads as follows:

-- 11. A golf ball comprising a core, an envelope layer positioned outside the core, a mid layer positioned outside the envelope layer, a cover positioned outside the mid layer and at least one layer positioned between the cover and the core wherein:

the core includes a center and a core outer layer positioned outside the center;

the core outer layer JIS-C hardness H3 at its innermost portion is greater than the center JIS-C hardness H2 at its surface by an amount that is equal to or less than 35; and the envelope layer Shore D hardness H5, the mid layer Shore D hardness H6 and the cover Shore D hardness H7 satisfy the following mathematical formula: $H5 > H6 > H7$. --

Signed and Sealed this
Twelfth Day of April, 2016

Michelle K. Lee
*Director of the United States Patent and Trademark Office*